(12) United States Patent
Artmeier et al.

(10) Patent No.: US 12,325,339 B2
(45) Date of Patent: Jun. 10, 2025

(54) VEHICLE WITH EXTENDED VENTILATION

(71) Applicant: Bayerische Motoren Werke Aktiengesellschaft, Munich (DE)

(72) Inventors: Felix Artmeier, Munich (DE); Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1273 days.

(21) Appl. No.: 17/048,407

(22) PCT Filed: Apr. 12, 2019

(86) PCT No.: PCT/EP2019/059383
§ 371 (c)(1),
(2) Date: Oct. 16, 2020

(87) PCT Pub. No.: WO2019/206673
PCT Pub. Date: Oct. 31, 2019

(65) Prior Publication Data
US 2021/0155129 A1  May 27, 2021

(30) Foreign Application Priority Data

Apr. 25, 2018 (DE) .......................... 102018206386.9

(51) Int. Cl.
*B60N 2/56* (2006.01)
*B60H 1/00* (2006.01)
*B60H 1/34* (2006.01)

(52) U.S. Cl.
CPC ....... *B60N 2/5657* (2013.01); *B60H 1/00285* (2013.01); *B60N 2/5628* (2013.01); *B60H 1/34* (2013.01)

(58) Field of Classification Search
CPC ............... B60N 2/5657; B60N 2/5628; B60H 1/00285; B60H 1/34
(Continued)

(56) References Cited

U.S. PATENT DOCUMENTS 5,385,382 A * 1/1995 Single, II .................. A47C 7/74
297/180.13
10,479,241 B2 * 11/2019 Filipkowski ............. B60N 2/01
(Continued)

FOREIGN PATENT DOCUMENTS

| CN | 101151743 A | 3/2008 |
| CN | 104648197 A | 5/2015 |

(Continued)

OTHER PUBLICATIONS

English translation of Chinese Office Action issued in Chinese Application No. 201980027446.4 dated Mar. 3, 2022 (seven (7) pages).

(Continued)

*Primary Examiner* — Steven B McAllister
*Assistant Examiner* — Charles R Brawner
(74) *Attorney, Agent, or Firm* — Crowell & Moring LLP

(57) ABSTRACT

A vehicle has a vehicle seat and a ventilation system with at least one supply nozzle via which an air flow can be guided towards the vehicle seat. The vehicle seat has an air feed opening for receiving the air flow from the supply nozzle, an outlet nozzle directed into a rear area of the vehicle interior, and an air-guiding channel for connecting the air feed opening and the outlet nozzle.

15 Claims, 2 Drawing Sheets

(58) Field of Classification Search
USPC .......................................................... 454/120
See application file for complete search history.

(56) References Cited

U.S. PATENT DOCUMENTS

| | | | |
|---|---|---|---|
| 2008/0047767 A1 | 2/2008 | Tsuchiya | |
| 2010/0314071 A1* | 12/2010 | Lee ................... | B60H 1/00285 |
| | | | 165/59 |
| 2012/0144844 A1* | 6/2012 | Park .................... | B60N 2/5657 |
| | | | 62/3.3 |
| 2015/0140915 A1* | 5/2015 | Rawlinson ........... | B60N 2/5621 |
| | | | 454/120 |
| 2015/0197136 A1* | 7/2015 | Chen .................. | B60H 1/00285 |
| | | | 62/3.61 |
| 2017/0015226 A1 | 1/2017 | Wolas | |
| 2019/0077286 A1* | 3/2019 | Filipkowski ......... | B60N 2/5628 |

FOREIGN PATENT DOCUMENTS

| | | | | |
|---|---|---|---|---|
| CN | 106427677 A | | 2/2017 | |
| DE | 10 2005 050 098 A1 | | 11/2006 | |
| DE | 102007042055 A1 | * | 3/2009 | ......... B60H 1/00564 |
| DE | 10 2015 100 309 A1 | | 7/2015 | |
| EP | 0 411 375 A1 | | 2/1991 | |
| EP | 2 873 553 A1 | | 5/2015 | |
| FR | 2 694 527 A1 | | 2/1994 | |
| FR | 2782953 A1 | * | 3/2000 | ............. B60H 1/247 |
| KR | 10-2004-0061224 A | | 7/2004 | |
| KR | 10-2016-0139837 A | | 12/2016 | |
| KR | 1020160139837 | * | 12/2016 | ......... B60H 1/00564 |

OTHER PUBLICATIONS

International Search Report (PCT/ISA/210) issued in PCT Application No. PCT/EP2019/059383 dated May 20, 2019 with English translation (four (4) pages).

German-language Written Opinion (PCT/ISA/237) issued in PCT Application No. PCT/EP2019/059383 dated May 20, 2019 (five (5) pages).

German-language Search Report issued in German Application No. 10 2018 206 386.9 dated Dec. 11, 2018 with partial English translation (12 pages).

* cited by examiner

VEHICLE WITH EXTENDED VENTILATION

BACKGROUND AND SUMMARY OF THE INVENTION

The present invention relates to a vehicle. The vehicle has in particular extended ventilation of a rear region behind the front seats.

It is known from the prior art that ventilation can be integrated in a seat back of a driver's seat or front passenger's seat. A passenger in the rear can thus profit in particular from frontal ventilation of the vehicle. In such systems, air is fed to the corresponding front seat via a tube system, and therefore said air can pass into the rear of the vehicle via the ventilation in the seat back. A system of this type is described, for example, in EP 0 411 375 A1.

A particular disadvantage of the known prior art is that use has to be made of a tube system for feeding the front seat with fresh air which can be discharged via the ventilation. It is therefore the object of the invention to provide a vehicle which, while being simply and cost-effectively manufactured and assembled, permits safe and reliable ventilation of a rear compartment of a vehicle.

The object is achieved by the features of the independent claim. The dependent claims contain preferred developments of the invention.

The object is thus achieved by a vehicle which has a vehicle seat and a ventilation system. The ventilation system comprises at least one supply nozzle via which an air flow can be conducted onto the vehicle seat. The vehicle seat in turn comprises a feed opening for receiving said air flow from the supply nozzle. In addition, the vehicle seat comprises an outlet nozzle which is directed into a rear compartment of the vehicle. This means that the outlet nozzle conveys air counter to a customary direction of travel. If the vehicle seat is a front seat, it is thus possible for the rear of the vehicle to be reached by use of the outlet nozzle. It is therefore possible to ventilate the rear compartment of the vehicle. In addition, the vehicle seat comprises an air-conducting duct for connecting the air feed opening to the outlet nozzle.

The solution according to the invention in particular does not require any tube system whatsoever for connecting the vehicle seat to a fresh air supply. On the contrary, the ventilation system which is present in any case in the vehicle can be extended by a further nozzle, the supply nozzle, which conducts air to the vehicle seat. The air can be received there via the air feed opening and distributed to the rear region of the vehicle via the outlet nozzle. In particular, no tube system whatsoever or similar is present between the supply nozzle and the air feed opening. The air flow is thus conducted directly through an interior space of the vehicle and is not delimited in relation to the interior space of the vehicle. In addition, it is advantageous if there is only a small gap between the supply nozzle and the air feed opening.

The air-conducting duct advantageously comprises a fan unit. The air flow can thus be sucked up from the supply nozzle by the air feed opening and can be actively discharged via the outlet nozzle. If a fan unit is used, a tube system, as in the prior art, is not necessary. On the contrary, the air provided via the supply nozzle can be sucked directly into the air feed opening of the vehicle seat and can thereby be discharged, in particular virtually completely, into the rear compartment of the vehicle via the outlet nozzle.

Furthermore, it is preferably provided that the supply nozzle is arranged in a center console of the vehicle. The air feed opening is arranged on a side wall of the vehicle seat, said side wall being assigned to the center console. In particular, the air feed opening is arranged in the region of the seat surface of the vehicle seat. It is particularly advantageous if the sole function of the supply nozzle is to conduct the air flow to the air feed opening of the vehicle seat. It is therefore particularly advantageous if the supply nozzle is provided on the center console so as not to be able to be reached and/or not to be visible by a driver or passenger of the vehicle. The effect thus achieved by this, firstly, can be that the air from the ventilation system can be fed safely and reliably to the vehicle seat and, secondly, there are no visual impairments whatsoever.

The supply nozzle advantageously has air-conducting elements. The air flow can be directed onto the vehicle seat by the air-conducting elements. In particular, it can be ensured by means of the air-conducting elements that the air flow is directed onto the air feed opening. If the vehicle seat is adjusted, for example owing to a longitudinal adjustment or a vertical adjustment, the position of the air feed opening is also changed. It is possible to ensure by means of the air-conducting elements that the air flow is always directed onto the air feed opening. The air from the supply nozzle can thus be directly transferred onto the vehicle seat.

The air-conducting elements are advantageously configured to be adjustable. The air flow can thus be tracked to an adjustment of the vehicle seat. The air provided by the supply nozzle can therefore be efficiently discharged from the vehicle seat to the rear compartment of the vehicle. The air feed opening minimizes losses in the receiving of the air flow from the supply nozzle.

The supply nozzle is advantageously formed directly adjacent to the air feed opening. Since in particular no tube whatsoever or similar connector is present between the supply nozzle and the air feed opening, the air flow is transmitted through the vehicle interior space. The effect achieved by arranging the supply nozzle and the air feed opening directly adjacent to one another is that a transmission distance is minimized. The air flow can thus be fed safely and reliably to the air feed opening in order to be discharged to the rear compartment of the vehicle via the outlet nozzle.

A clearance advantageously remains between the supply nozzle and the air feed opening. This clearance ensures that no transmission means whatsoever, such as, for example, a tube or a duct, is present. The vehicle seat is thus separated from the ventilation system of the vehicle. This simplifies a design and production of the vehicle. It is nevertheless ensured, by means of the air flow between the supply nozzle and the air feed opening, that the vehicle seat can be supplied with air from the ventilation system of the vehicle.

The outlet nozzle preferably has a hollow cylinder shape with a hollow wall. The hollow wall encloses an interior space, wherein the interior space is coupled to the air-conducting duct of the vehicle seat. The air which is received via the air feed opening can thus be transferred into the interior space. The hollow wall is open toward the interior volume of the hollow cylinder shape. The air from the interior space can thus pass through the opening to the interior volume of the hollow cylinder shape. In particular an air flow through the interior volume of the hollow cylinder shape can thereby be achieved.

The wall particularly advantageously has a wing-shaped cross section. The wall thus comprises a profile lug and an end strip, wherein the wall is open at the profile lug toward the interior volume. The air can therefore flow from the interior space of the wall to the interior volume. Since this takes place at the profile lug, the air flow runs further along the wall, as a result of which the air is conducted from the profile lug to the end strip. It is provided that the diameter of the interior volume is greater at the end strip than at other locations, in particular at the profile lug. In this manner, in particular an additional air flow is sucked through the interior volume of the hollow cylinder shape, such that, there is a further air flow in addition to the air flow which passes from the interior space of the hollow wall into the interior volume of the hollow cylinder shape. In addition, the mixing in of air advantageously takes place outside the interior volume of the hollow cylinder shape. The end strip thus represents in particular an exit for the air flow. Downstream of the end strip, ambient air is mixed into the air flow such that, in turn, there is an increase in the air flow. The outlet nozzle thus makes it possible, even when there is a small mass flow through the air feed opening and the air-conducting duct, for a high mass flow of air to reach the rear compartment of the vehicle. The vehicle seat can thus be constructed simply and with a low outlay; in particular, a fan unit of reduced power is sufficient to enable air to flow out of the outlet nozzle into the rear compartment of the vehicle.

The ventilation system preferably comprises an air conditioning system module. The air conditioning system module cools the air such that a cooled air flow can be discharged from the supply nozzle. Cooled air can thus also pass into the rear vehicle region through the outlet nozzle, as a result of which the rear region of the vehicle can be cooled. This takes place while simultaneously dispensing with an explicit connection of the vehicle seat to the ventilation system, for example via a tube. The vehicle can thus be manufactured simply and with a low outlay, but at the same time permits increased comfort in particular of passengers in the rear region of the vehicle.

The vehicle seat preferably has a seat ventilation system. The seat ventilation system is coupled to the air-conducting duct by the air-conducting duct having a branch to the seat ventilation system. The branch can be arranged in particular upstream or downstream of a previously described fan unit. In an advantageous manner, the branch can be constricted and particularly advantageously has an air flap. The air flap can in particular be operated by motor. By means of the branch, some or all of the air flow received via the air feed opening can be used for seat ventilation and/or seat temperature control of the vehicle seat. Depending on whether the branch is arranged upstream or downstream of the fan unit, the seat ventilation and/or seat temperature control can thus take place with or without assistance of the fan unit. In a particularly advantageous manner, there is an, in particular constrictable, branch both upstream and downstream of the fan unit, and therefore it is selectively possible for seat ventilation and/or seat temperature control to take place with or without blower assistance. In each case, the temperature of the seat ventilation and/or seat temperature control can be controlled via the air conditioned air of the vehicle air conditioning system. It is thus possible in particular to omit seat heating or seat air conditioning of the vehicle seat.

Further details, features and advantages of the invention emerge from the description below and the figures.

DETAILED DESCRIPTION OF THE DRAWINGS

Figure 1:
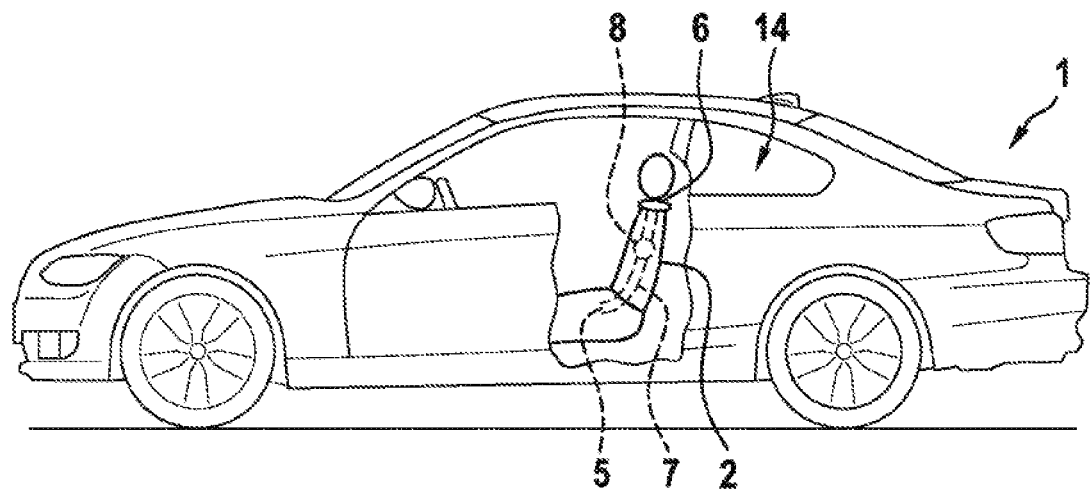
FIG. 1 is a schematic view of a vehicle according to an exemplary embodiment of the invention.

FIG. 1 schematically shows a vehicle 1 according to an exemplary embodiment of the invention. The vehicle 1 comprises a vehicle seat 2. The vehicle seat 2 serves for ventilating a rear region 14 of the vehicle 1. In the rear region 14 there are in particular passengers for whom, frequently, dedicated ventilation or sufficient ventilation is not available. In particular, a supply of air cooled by an air conditioning system is possible only to a very restricted extent. The rear region 14 is in particular a region of the vehicle 1 that is located behind the front seats of the vehicle 1 with respect to a customary direction of travel of the vehicle 1.

Figure 2:
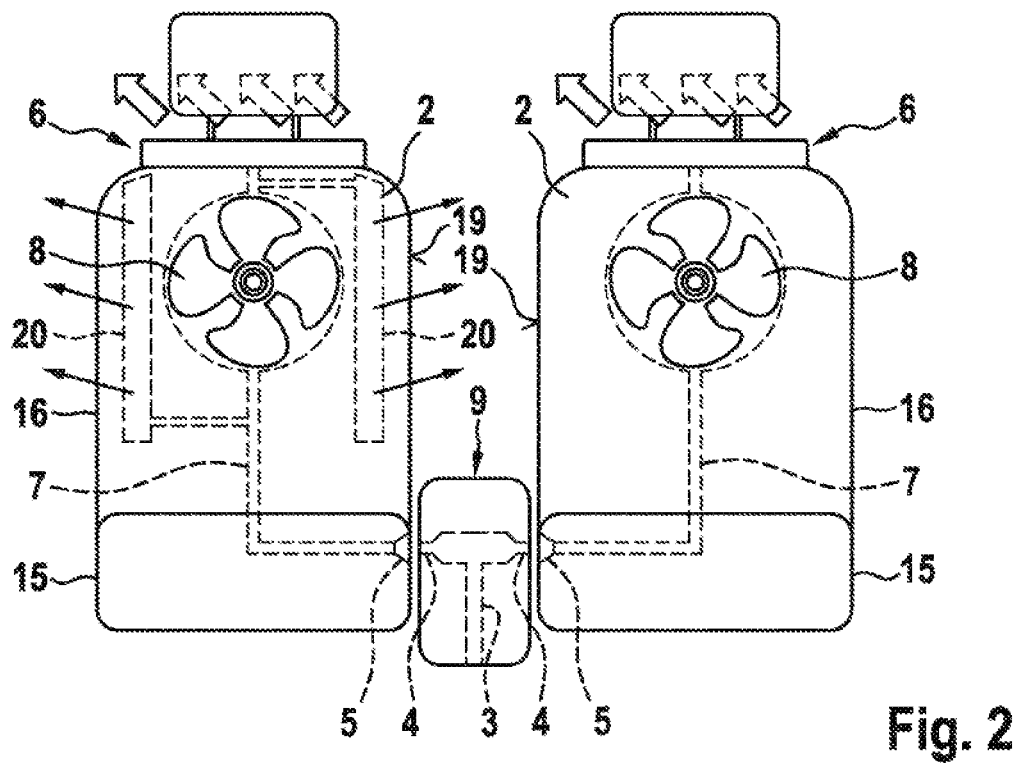
FIG. 2 is a schematic view of two vehicle seats of the vehicle according to the exemplary embodiment of the invention.

FIG. 2 schematically shows two vehicle seats 2 which are in particular front seats of the vehicle 1. Thus, one of the vehicle seats 2 is a driver's seat and the other of the vehicle seats 2 is a front passenger's seat. Each of the vehicle seats has a seat surface 15 and a seat back 16. An outlet nozzle 6 is in each case arranged on the seat back 16 in order to transmit air into the rear region 14 of the vehicle 1. This air is received previously via an air feed opening 5 of the respective vehicle seat 2. The air feed opening 5 is coupled to the outlet nozzle 6 via an air-conducting duct 7. A fan unit 8 is advantageously arranged within the air-conducting duct 7, for actively sucking up air through the air feed opening 5 and discharging same via the outlet nozzle 6.

In addition, the vehicle 1 has a ventilation system 3, wherein only a partial region of the ventilation system 3 in a center console 9 of the vehicle 1 is schematically illustrated. The ventilation system 3 comprises in particular a fresh air intake of the vehicle 1 and an air conditioning system module. Air cooled inside the vehicle 1 can thus be discharged. In order also to supply the rear region 14 of the vehicle 1 with cooled air, the center console 9 has a supply nozzle 4 for each vehicle seat 2. It is provided that the air feed openings 5 of the vehicle seats 2 are arranged on the side wall 19 of the respective vehicle seat 2, said side wall facing the center console 9. It is thus possible for an air flow of the supply nozzles 4 to pass directly to the air feed openings 5. The fan unit 8 of the respective vehicle seat causes the air flow to be sucked up from the supply nozzle 4, and therefore cooled air of the ventilation system 3 of the vehicle 1 can be discharged via the outlet nozzle 6.

The vehicle seats 2 advantageously have a seat ventilation system 20. One such seat ventilation system 20 is shown schematically in FIG. 2 for one of the vehicle seats 2. The seat ventilation system 20 is coupled to the air-conducting duct 7 via a branch. The seat ventilation system comprises a multiplicity of openings in the vehicle seat 2, wherein said openings can be present both in the seat surface 15 and in the seat back 16. Air can flow out of the vehicle seat 2 through said openings and can pass to the user of the vehicle seat 2.

The seat ventilation system 20 can have the branch from the air-conducting duct 7 upstream and/or downstream of the fan unit 8. In particular, each branch can be constricted, which can be realized, for example, by a motor-operated air flap. All or some of the air received via the air feed opening 5, i.e. the air flow blown into the air feed opening 5, can be used by means of a branch upstream of the fan unit 8 for ventilating the vehicle seat 2. If the branch is arranged downstream of the fan unit 8, said seat ventilation can be additionally assisted by the fan unit 8. Some or all of the air flow can again be used for the seat ventilation. In a particularly advantageous manner, the seat ventilation system 20 can in each case have a branch upstream and downstream of the fan unit 8, with it being possible for each of the branches to be selectively used for feeding air to the seat ventilation system 20.

It is possible, by means of the branch to the seat ventilation system 20, to ventilate, and thus to control the temperature of, the vehicle seat 2 via air conditioned air of the air conditioning system of the vehicle 1. Thus, first of all, cooling, and secondly also heating, of the vehicle seat 2 is made possible in a simple manner and with little outlay. Additional seat heating or additional seat air conditioning is therefore not necessary.

Figure 3:
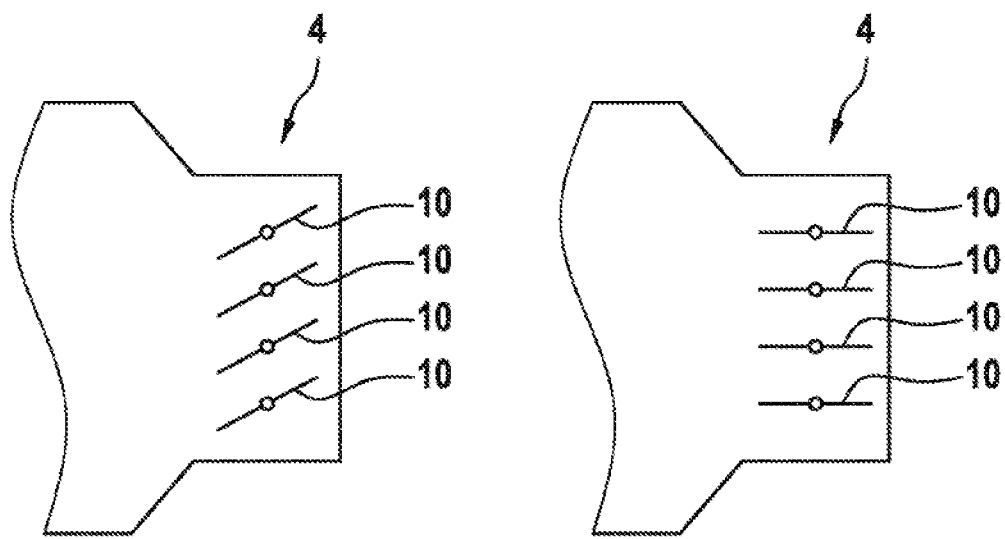
FIG. 3 is a schematic illustration of the outlet nozzle of the vehicle seats of the vehicle according to the exemplary embodiment of the invention.

The vehicle seats 2 as front seats of the vehicle 1 are customarily configured to be adjustable. Firstly, a longitudinal adjustment parallel to a direction of travel of the vehicle 1 is possible. A vertical adjustment perpendicular to the direction of travel of the vehicle 1 is also made possible. In order nevertheless to be able to ensure that the air of the ventilation system 3 can pass via the supply nozzles 4 to the air feed opening 5, the supply nozzles 4 in the center console 9 preferably have air-conducting elements 10, as shown in FIG. 3. The air-conducting elements 10 are configured to be adjustable and thus permit the air flow always to be directed onto the air feed opening 5, irrespective of in which specific position the vehicle seat 2 is located.

It is thus made possible for an air flow to pass safely and reliably from the supply nozzle 4 to the air feed opening 5. More extensive measures permitting a transmission of air between supply nozzle 4 and air feed opening 5 are therefore unnecessary. In particular, a tube can be dispensed with. The vehicle seat 2 is thus separated from the ventilation system 3, since in particular an intermediate space remains between the air feed opening 5 and the supply nozzle 4. Nevertheless, the air flow between supply nozzle 4 and air feed opening 5 makes it possible for cooled air to be able to pass from the ventilation system 3 of the vehicle 1 to the outlet nozzle 6.

Figure 4:
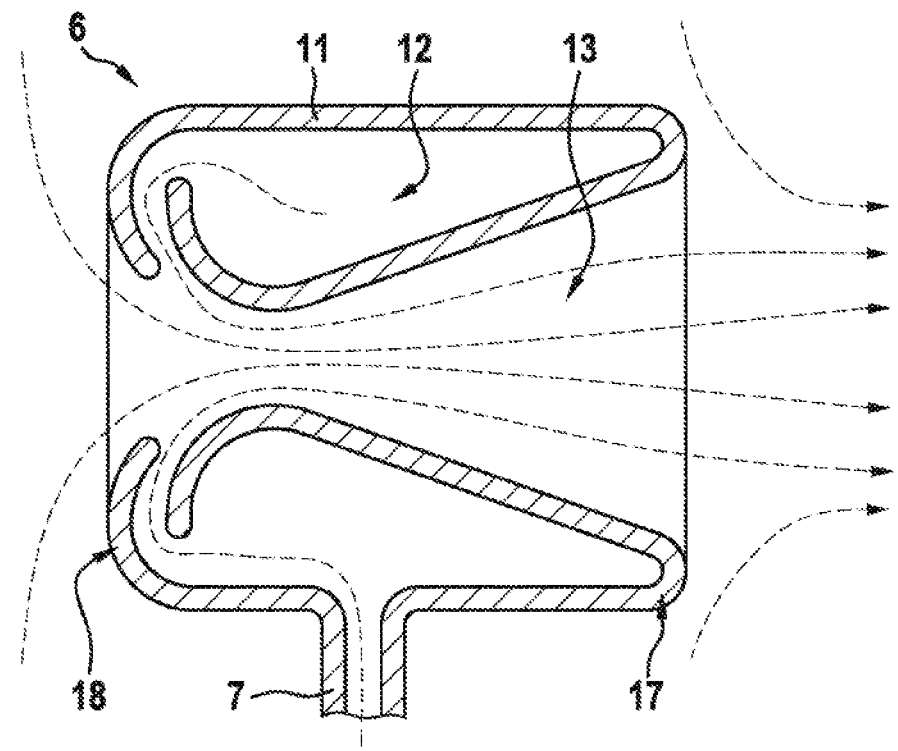
FIG. 4 is a further schematic view of the outlet nozzle of the vehicle seats of the vehicle according to the exemplary embodiment of the invention.

The outlet nozzle 6 advantageously has a special shape in order to permit a large air flow into the rear region 14 of the vehicle 1. An exemplary shape is illustrated schematically in FIG. 4. It is provided that the outlet nozzle 6 is configured in the shape of a hollow cylinder, wherein the hollow cylinder shape surrounds an interior volume 13. A wall 11 of the hollow cylinder is likewise configured to be hollow and thus surrounds an interior space 12. A cross section of the wall 11 has the shape of a wing profile such that the hollow cylinder shape extends between a profile lug 18 and an end strip 17. The wall 11 is open in the region of the profile lug 18 such that the interior space 12 is connected to the interior volume 13.

The interior space 12 is coupled to the air-conducting duct 7, and therefore the air which was received via the air feed opening 5 can be conducted into the interior space 12. The air passes from the interior space 12 at the profile lug 18 into the interior volume 13. Owing to the wing profile shape of the wall 11, the air escaping the interior space 12 flows along the wall 11 to the end strip 17, wherein air is sucked via the profile-lug-side end side of the hollow cylinder shape into the interior volume 13 because of the changing interior diameter ratios of the interior volume 13. The effect achieved by this is that an air flow leaving the outlet nozzle 6 at the end strip 17 is enlarged in comparison to the air flow within the air-conducting duct 7. In addition, ambient air is mixed into the air flow after the latter has left the outlet nozzle 6. The air flow from the outlet nozzle 6 is thereby increased further.

The vehicle 1 according to the described exemplary embodiment of the invention thus permits vehicle seats 2 that enable ventilation of the rear region 14 of the vehicle 1 to be provided simply and with a low outlay. The vehicle seats 1 do not have to be connected to a ventilation system 3 of the vehicle 1 via tubes or similar elements. Nevertheless, the rear region 14 can be supplied with air cooled by the ventilation system 3.

LIST OF REFERENCE SIGNS

1 Vehicle
2 Vehicle seat
3 Ventilation system
4 Supply nozzle
5 Air feed opening
6 Outlet nozzle
7 Air-conducting duct
8 Fan unit
9 Center console
10 Air-conducting element
11 Wall
12 Interior space
13 Interior volume
14 Rear region
15 Seat surface
16 Seat back
17 End strip
18 Profile lug
19 Side wall
20 Seat ventilation system

What is claimed is:

1. A vehicle, comprising:
a vehicle seat;
a ventilation system with at least one supply nozzle via which an air flow is conductible into the vehicle seat, wherein the vehicle seat comprises:
(i) an air feed opening for receiving the air flow from the supply nozzle,
(ii) an outlet nozzle directed into a rear compartment of the vehicle, and
(iii) an air-conducting duct for connecting the air feed opening and the outlet nozzle, and
the supply nozzle has adjustable air-conducting elements, separate from the air feed opening, for adjusting an angle of the air flow into the air feed opening,
wherein a clearance remains between the supply nozzle and the air feed opening, and
wherein the ventilation system is characterized by an absence of a conduit extending between the supply nozzle and the air feed opening.

2. The vehicle according to claim 1, wherein
the air-conducting duct has a fan unit for sucking up the air flow from the supply nozzle and discharging same via the outlet nozzle.

3. The vehicle according to claim 1, wherein
the supply nozzle is arranged in a center console of the vehicle, and
the air feed opening is arranged on a side wall of the vehicle seat, said side wall being assigned to the center console.

4. The vehicle according to claim 1, wherein
the supply nozzle has air-conducting elements for directing the air flow into the air feed opening.

5. The vehicle according to claim 1, wherein
the air-conducting elements are configured to be adjustable.

6. The vehicle according to claim 1, wherein the supply nozzle is formed adjacent to the air feed opening such that the air-conducting elements direct the airflow from the supply nozzle to the air feed opening.

7. The vehicle according to claim 1, wherein
the outlet nozzle has a hollow cylinder shape with a hollow wall,
an interior space of the hollow wall is coupled to the air-conducting duct, and
the hollow wall is open toward an interior volume of the hollow cylinder shape.

8. The vehicle according to claim 7, wherein
the hollow wall has a wing-shaped cross section with a profile lug and an end strip, wherein the hollow wall is open at the profile lug toward the interior volume.

9. The vehicle according to claim 1, wherein
the ventilation system has an air conditioning system module for discharging a cooled air flow from the supply nozzle.

10. The vehicle according to claim 1, wherein
the air-conducting duct has a branch to a seat ventilation system of the vehicle seat.

11. The vehicle according to claim 10, wherein
the branch is constrictable.

12. A vehicle, Comprising:
A vehicle seat;
A ventilation system with at least one supply nozzle via which an air flow is conductible into the vehicle seat;
Wherein the vehicle seat comprises:
(i) an air feed opening for receiving the air flow from the supply nozzle,
(ii) an outlet nozzle directed into a rear compartment of the vehicle, and
(iii) an air-conducting duct for connecting the air feed opening and the outlet nozzle, and
The supply nozzle has air conducting elements, spaced apart from the air feed opening, for directing the air flow into the vehicle seat, and
Wherein the supply nozzle is formed adjacent to the air feed opening such that the air-conducting elements direct the airflow from the supply nozzle to the air feed opening.

13. The vehicle according to claim 12, wherein
a clearance remains between the supply nozzle and the air feed opening.

14. A vehicle, comprising:
a vehicle seat;
a ventilation system with at least one supply nozzle via which an air flow is conductible into the vehicle seat,
wherein the vehicle seat comprises:
(i) an air feed opening for receiving the air flow from the supply nozzle,
(ii) an outlet nozzle directed into a rear compartment of the vehicle, and
(iii) an air-conducting duct for connecting the air feed opening and the outlet nozzle, and
the supply nozzle has air-conducting elements, separate from the air feed opening, for directing the air flow into the vehicle seat, and
wherein the outlet nozzle has a hollow cylinder shape with a hollow wall, an interior space of the hollow wall is coupled to the air-conducting duct, and the hollow wall is open toward an interior volume of the hollow cylinder shape.

15. The vehicle according to claim 14, wherein
the hollow wall has a wing-shaped cross section with a profile lug and an end strip, wherein the hollow wall is open at the profile lug toward the interior volume.

\* \* \* \* \*